(12) United States Patent
Lei et al.

(10) Patent No.: US 11,147,048 B2
(45) Date of Patent: Oct. 12, 2021

(54) METHOD FOR RESOURCE SCHEDULING AND RELATED DEVICES

(71) Applicant: Yulong Computer Telecommunication Scientific (Shenzhen) Co., Ltd., Guangdong (CN)

(72) Inventors: Yixue Lei, Guangdong (CN); Yunfei Zhang, Guangdong (CN)

(73) Assignee: Yulong Computer Telecommunication Scientific (Shenzhen) Co., Ltd., Shenzhen (CN)

(*) Notice: Subject to any disclaimer, the term of this patent is extended or adjusted under 35 U.S.C. 154(b) by 20 days.

(21) Appl. No.: 16/589,863

(22) Filed: Oct. 1, 2019

(65) Prior Publication Data
US 2020/0059923 A1   Feb. 20, 2020

Related U.S. Application Data

(63) Continuation of application No. PCT/CN2018/074153, filed on Jan. 25, 2018.

(30) Foreign Application Priority Data

May 5, 2017 (CN) .......................... 201710313202.5

(51) Int. Cl.
| | |
|---|---|
| *H04W 4/00* | (2018.01) |
| *H04W 72/04* | (2009.01) |
| *H04W 40/22* | (2009.01) |
| *H04W 88/04* | (2009.01) |

(52) U.S. Cl.
CPC ....... *H04W 72/0413* (2013.01); *H04W 40/22* (2013.01); *H04W 72/042* (2013.01); *H04W 88/04* (2013.01)

(58) Field of Classification Search
CPC ..... H04W 40/00; H04W 40/02; H04W 40/20; H04W 40/205; H04W 40/202;
(Continued)

(56) References Cited

U.S. PATENT DOCUMENTS

2009/0117921 A1* 5/2009 Beydler .............. G06F 16/9537
455/457
2015/0215923 A1    7/2015 Jha et al.
(Continued)

FOREIGN PATENT DOCUMENTS

| CN | 104272827 A | 1/2015 |
|---|---|---|
| CN | 104469961 A | 3/2015 |

(Continued)

OTHER PUBLICATIONS

International search report issued in corresponding international application No. PCT/CN2018/074153 dated Apr. 18, 2018.
(Continued)

*Primary Examiner* — Matthew W Genack
(74) *Attorney, Agent, or Firm* — Young Basile Hanlon & MacFarlane, P.C.

(57) ABSTRACT

A method for resource scheduling and related products are provided according to implementations of the present disclosure. The method includes the following. A base station receives a scheduling request from a first terminal through higher layer signaling, where the scheduling request is sent by a second terminal to the first terminal, the first terminal is within coverage of the base station, and the second terminal is outside the coverage of the base station. The base station sends a scheduled resource through the higher layer signaling to the first terminal according to the scheduling request, where the scheduled resource is forwarded by the first terminal to the second terminal. By adopting the implementations of the present disclosure, an objective can be achieved that the base station directly schedules wireless resources configuration for the terminal outside the coverage of the base station in the relay scenario.

8 Claims, 3 Drawing Sheets

(58) Field of Classification Search
CPC . H04W 72/00; H04W 72/04; H04W 72/0413; H04W 72/042
See application file for complete search history.

(56) References Cited

U.S. PATENT DOCUMENTS

| | | | | |
|---|---|---|---|---|
| 2016/0234754 | A1* | 8/2016 | Baghel | H04W 72/1289 |
| 2016/0302251 | A1* | 10/2016 | Chatterjee | H04W 72/02 |
| 2017/0071010 | A1 | 3/2017 | Lim et al. | |
| 2020/0305167 | A1* | 9/2020 | Freda | H04L 1/1642 |

FOREIGN PATENT DOCUMENTS

| | | |
|---|---|---|
| CN | 104869526 A | 8/2015 |
| CN | 104954976 A | 9/2015 |
| CN | 105472740 A | 4/2016 |
| CN | 105657838 A | 6/2016 |
| CN | 105846882 A | 8/2016 |
| CN | 107071916 A | 8/2017 |
| WO | 2016163747 A1 | 10/2016 |
| WO | 2016181094 A1 | 11/2016 |

OTHER PUBLICATIONS

Huawei et al. "Resource Allocation for PC5 in Layer 2 Evolved UE-to-NW Relay, R2-1703230", 3GPP TSG-RAN WG2 Meeting #97bis. Mar. 25, 2017 (Mar. 25, 2017), chapters 2 and 3.
The Supplementary European Search Report issued in corresponding EP No. EP18793741 dated Nov. 16, 2020.

* cited by examiner

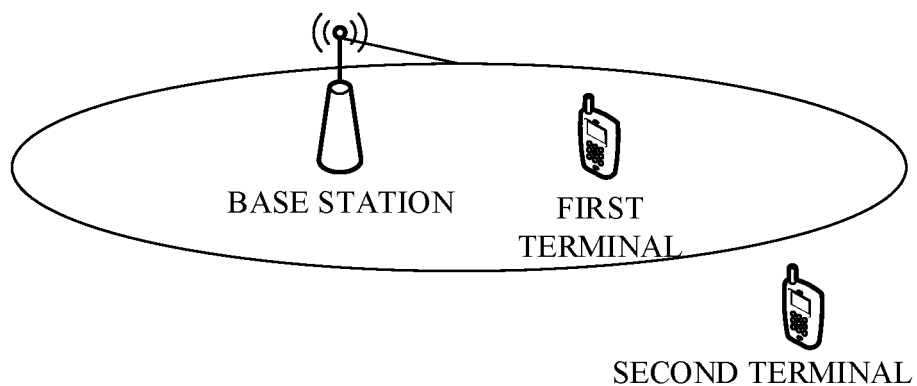

FIG. 1

| A base station receives a scheduling request from a first terminal through higher layer signaling, where the scheduling request is sent by a second terminal to the first terminal, the first terminal is within coverage of the base station, and the second terminal is outside the coverage of the base station | S201 |

| The base station sends a scheduled resource through the higher layer signaling to the first terminal according to the scheduling request, where the scheduled resource is forwarded by the first terminal to the second terminal | S202 |

FIG. 2

METHOD FOR RESOURCE SCHEDULING AND RELATED DEVICES

CROSS-REFERENCE TO RELATED APPLICATION(S)

This application is a continuation of PCT application No. PCT/CN2018/074153, filed on Jan. 25, 2018, which claims priority to Chinese Patent Application No. 201710313202.5, filed on May 5, 2017, the disclosures of which are hereby incorporated by reference in their entireties.

TECHNICAL FIELD

The present disclosure relates to the technical field of wireless communications, and particularly to a method for resource scheduling and related devices.

BACKGROUND

Device to device (D2D) refers to a communication technology that user equipment (UE) can communicate directly with each other without transmitting or forwarding through a device such as a base station. D2D can be deployed within and/or outside cellular network coverage. UE-to-network relay, a feature introduced in D2D communication, has an advantage of flexible deployment, which can extend network coverage without addition of network devices, and thus has important applications in the field of commercial communications, public safety communications (such as earthquakes, wars), etc.

Solutions in Rel-12 to Rel-14 define D2D communication in scheduled mode and in resource pool mode. A base station allocates to a terminal a resource or resource pool for D2D communication, or the terminal on its own selects transmission resources according to a resource pool broadcast by the base station or a pre-configured resource pool. In case that a terminal A locates within coverage of the base station, a terminal B locates outside the coverage, and the terminal A is served as a relay to the terminal B, the terminal B can only use resources pre-configured or resource pools configured by the base station, while the base station cannot schedule resources directly to the terminal B, which has limits on D2D communications under the fifth generation (5G) mobile communication.

SUMMARY

Implementations of the present disclosure provides a method for resource scheduling and related devices, which can solve a problem that a base station cannot schedule resources directly for remote user equipment (UE) in a relay scenario.

According to a first aspect of the present disclosure, a method for resource scheduling is provided. The method includes the following.

A base station receives a scheduling request from a first terminal through higher layer signaling, where the scheduling request is sent by a second terminal to the first terminal, the first terminal is within coverage of the base station, and the second terminal is outside the coverage of the base station. The base station sends a scheduled resource through the higher layer signaling to the first terminal according to the scheduling request, where the scheduled resource is forwarded by the first terminal to the second terminal.

According to a second aspect of the present disclosure, a method for resource scheduling is provided. The method includes the following.

A second terminal sends a scheduling request through higher layer signaling to a first terminal, where the scheduling request is forwarded by the first terminal to a base station, the first terminal is within coverage of the base station, and the second terminal is outside the coverage of the base station. The second terminal receives a scheduled resource from the first terminal, where the scheduled resource is sent by the base station to the first terminal through the higher layer signaling according to the scheduling request.

According to a third aspect of the present disclosure, a base station is provided. The base station includes at least one processor and a computer readable storage coupled with the at least one processor and storing at least one computer executable instruction therein which, when executed by the at least one processor, causes the at least one processor to receive a scheduling request from a first terminal through higher layer signaling, and to send a scheduled resource through the higher layer signaling to the first terminal according to the scheduling request. The scheduling request is sent by a second terminal to the first terminal. The first terminal is within coverage of the base station. The second terminal is outside the coverage of the base station. The scheduled resource is forwarded by the first terminal to the second terminal.

According to a fourth aspect, a second terminal is provided. The second terminal includes at least one processor and a computer readable storage coupled with the at least one processor and storing at least one computer executable instruction therein which, when executed by the at least one processor, causes the at least one processor to send a scheduling request through higher layer signaling to a first terminal, and to receive a scheduled resource from the first terminal. The scheduling request is forwarded by the first terminal to a base station. The first terminal is within coverage of the base station, and the second terminal is outside the coverage of the base station. The scheduled resource is sent from the base station to the first terminal through the higher layer signaling according to the scheduling request.

To implement implementations of the present disclosure, the base station first receives the scheduling request from the first terminal through the higher layer signaling, where the scheduling request is sent by the second terminal to the first terminal, the first terminal is within the coverage of the base station, and the second terminal is outside the coverage of the base station. Then, according to the scheduling request, the base station sends the scheduled resource through the higher layer signaling to the first terminal, where the scheduled resource is forwarded by the first terminal to the second terminal. By transmission of scheduling signaling between the base station and the terminal outside the coverage of the base station based on the higher layer signaling, an objective can be achieved that the base station directly schedules resources for the remote terminals in the relay scenario.

BRIEF DESCRIPTION OF DRAWINGS

To describe the technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

FIG. 1 is a schematic diagram illustrating an architecture of D2D connection system according to an implementation of the present disclosure;

FIG. 2 is a flowchart of a method for resource scheduling according to an implementation of the present disclosure;

DETAILED DESCRIPTION

Figure 3:
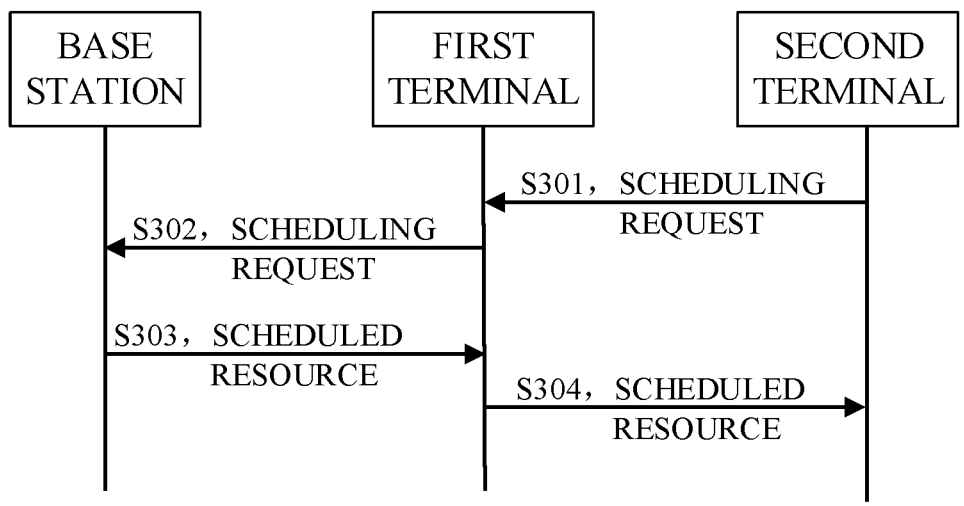
FIG. 3 is a flowchart of a method for resource scheduling according to another implementation of the present disclosure.

Technical solutions in the embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

Referring to FIG. 1, FIG. 1 is a schematic diagram illustrating an architecture of D2D connection system according to an implementation of the present disclosure. A system information transmission system includes a base station, a first terminal, and a second terminal. The first terminal is a relay user equipment (UE), which locates within coverage of the base station. The second terminal is a remote UE, which locates outside the coverage of the base station. The first or second terminal can refer to a device providing voice and/or data connectivity to a user. The first or second terminal can be connected to a computing device such as a laptop computer or desktop computer, or can be a standalone device such as a personal digital assistant (PDA). The first or second terminal can also be called a system, a subscriber unit, a subscriber station, a mobile station, a mobile, a remote station, an access point, a remote terminal, an access terminal, a user terminal, a user agent, or a user device. The base station can be an access point, NodeB, evolve NodeB (eNB), or next generation base station (gNB), and can refer to a device in an access network that communicates over the air-interface, through one or more sectors, with wireless terminals. By converting received air-interface frames to IP packets, the base station can act as a router between the wireless terminal and the rest of the access network, which can include an Internet Protocol (IP) network. The base station also coordinates management of attributes for the air interface.

According to a first aspect of the present disclosure, a method for resource scheduling is provided. The method includes the following.

A base station receives a scheduling request from a first terminal through higher layer signaling, where the scheduling request is sent by a second terminal to the first terminal, the first terminal is within coverage of the base station, and the second terminal is outside the coverage of the base station. The base station sends a scheduled resource through the higher layer signaling to the first terminal according to the scheduling request, where the scheduled resource is forwarded by the first terminal to the second terminal.

In one implementation, the resource scheduling is independent of a physical layer channel between the base station and the second terminal.

In one implementation, the scheduling request includes a periodic service request and the scheduled resource includes a semi-persistent scheduled resource. The base station sends the scheduled resource through the higher layer signaling to the first terminal according to the scheduling request as follows. The base station allocates the semi-persistent scheduled resource according to the periodic service request. The base station sends the semi-persistent scheduled resource through the higher layer signaling to the first terminal.

In one implementation, the higher layer signaling includes a radio resource control (RRC) message.

According to a second aspect of the present disclosure, a method for resource scheduling is provided. The method includes the following.

A second terminal sends a scheduling request through higher layer signaling to a first terminal, where the scheduling request is forwarded by the first terminal to a base station, the first terminal is within coverage of the base station, and the second terminal is outside the coverage of the base station. The second terminal receives a scheduled resource from the first terminal, where the scheduled resource is sent by the base station to the first terminal through the higher layer signaling according to the scheduling request.

In one implementation, the scheduling request includes a periodic service request. The second terminal sends the scheduling request through the higher layer signaling to the first terminal as follows. The second terminal determines a service type of a data service. The second terminal sends the periodic service request through the higher layer signaling to the first terminal based on a determination that the service type of the data service is a periodic service.

In one implementation, when the data service is a non-periodic service but the second terminal determines that the data service approximates to the periodic service, the second terminal determines that the service type of the data service is the periodic service.

In one implementation, the scheduled resource includes a semi-persistent scheduled resource. After the second terminal sends the periodic service request through the higher layer signaling to the first terminal, the method further includes the following. The second terminal receives the semi-persistent scheduled resource from the first terminal, where the semi-persistent scheduled resource is sent by the base station through the higher layer signaling to the first terminal.

In one implementation, the higher layer signaling includes an RRC message.

According to a third aspect, a base station is provided. The base station includes at least one processor and a computer readable storage coupled with the at least one processor and storing at least one computer executable instruction therein which, when executed by the at least one processor, causes the at least one processor to receive a scheduling request from a first terminal through higher layer signaling, and to send a scheduled resource through the higher layer signaling to the first terminal according to the scheduling request. The scheduling request is sent by a second terminal to the first terminal. The first terminal is within coverage of the base station. The second terminal is outside the coverage of the base station. The scheduled resource is forwarded by the first terminal to the second terminal.

In one implementation, the resource scheduling is independent of a physical layer channel between the base station and the second terminal.

In one implementation, the scheduling request includes a periodic service request and the scheduled resource includes a semi-persistent scheduled resource. The at least one processor is configured to allocate a semi-persistent scheduled resource according to the periodic service request, and to send the semi-persistent scheduled resource through the higher layer signaling to the first terminal.

In one implementation, the higher layer signaling includes an RRC message.

According to a fourth aspect, a second terminal is provided. The second terminal includes at least one processor and a computer readable storage coupled with the at least one processor and storing at least one computer executable instruction therein which, when executed by the at least one processor, causes the at least one processor to send a scheduling request through higher layer signaling to a first terminal, and to receive a scheduled resource from the first terminal. The scheduling request is forwarded by the first terminal to a base station. The first terminal is within coverage of the base station, and the second terminal is outside the coverage of the base station. The scheduled resource is sent from the base station to the first terminal through the higher layer signaling according to the scheduling request.

In one implementation, the scheduling request includes a periodic service request. The at least one processor is configured to determine a service type of a data service, and to send the periodic service request through the higher layer signaling to the first terminal based on a determination that the service type of the data service is a periodic service.

In one implementation, the at least one processor is further configured to determine that the service type of the data service is the periodic service when the data service is a non-periodic service but the second terminal determines that the data service approximates to the periodic service.

In one implementation, the scheduled resource includes a semi-persistent scheduled resource. The at least one processor is configured to receive the semi-persistent scheduled resource from the first terminal, where the semi-persistent scheduled resource is sent by the base station through the higher layer signaling to the first terminal.

In one implementation, the higher layer signaling includes but is not limited to an RRC message.

Referring to FIG. 2, FIG. 2 is a flowchart of a method for resource scheduling according to an implementation of the present disclosure. The resource scheduling is independent of a physical layer channel between a base station and a second terminal. Rather, higher layer signaling is deployed to implement scheduling control of resources indirectly. As illustrated, the method according to the implementation of the present disclosure includes the following.

At S201, a base station receives a scheduling request from a first terminal through higher layer signaling, where the scheduling request is sent by a second terminal to the first terminal, the first terminal is within coverage of the base station, and the second terminal is outside the coverage of the base station.

In one implementation, the scheduling request may be a periodic service request. The second terminal may obtain traffic status of a current data service. According to the traffic status of the current data service, the second terminal may determine a service type of the data service. When the service type of the data service is a periodic service, the second terminal sends the periodic service request through the higher layer signaling to the first terminal. The first terminal forwards the periodic service request to the base station after receiving the periodic service request. When the service type of the data service is a non-periodic service, the second terminal may also send the scheduling request through the higher layer signaling. However, when the data service is not the absolute periodic service but approximates to the periodic service, in particularly a service that allows buffering in transmit end and traffic shaping, the second terminal may also send the periodic service request to the base station so as to obtain periodic scheduled resources. In one example, the second terminal does not need to determine the service type when the data service itself is a periodic service.

In one implementation, the higher layer signaling includes but is not limited to a radio resource control (RRC) message. In a traditional scheduling mechanism, dynamic scheduling of LTE system mainly relies on a scheduling request (SR), a buffer status report (BSR), or an uplink scheduling grant (UL grant) for resource scheduling. According to implementations of the present disclosure, the original underlying (such as a control element (CE) of the media access control (MAC) or a physical layer) scheduling function is implemented through the RRC message to avoid excessive impact on the MAC and underlying protocol.

At S203, the base station sends a scheduled resource through the higher layer signaling to the first terminal according to the scheduling request, where the scheduled resource is forwarded by the first terminal to the second terminal.

In one implementation, the base station allocates a semi-persistent scheduled resource according to the periodic service request, and sends the semi-persistent scheduled resource through the higher layer signaling to the first terminal. Therefore, scheduling resources can be saved and latency of dynamic scheduling can be reduced. A semi-persistent scheduling mode means that during scheduling transmission of the LTE, the base station instructs current scheduling information to the UE through a physical downlink control channel (PDCCH) in initial scheduling, and when the UE identifies the semi-persistent scheduling mode according to the scheduling information, the UE saves the current scheduling information and performs sending or receiving of data services at a same time-frequency resource location every fixed period.

It should be noted that according to the traditional resource scheduling mechanism, the second terminal may use a sidelink (SL) SR or SL BSR mechanism to send the scheduling request over PC5 interface (interface between terminals) between the first terminal and the second terminal. Further, the first terminal forwards the SR or SL BSR to the base station. Upon receiving the scheduling request, the base station allocates resources to the second terminal, which is indicated by a scheduling grant message over Uu interface (interface between the base station and the terminal) and PC5 interface. However, the transmission of MAC messages may be delayed when forwarded by the first terminal, and a timing relationship between the SR/BSR and the grant may not be guaranteed. Consequently, in implementations of the present disclosure, the scheduling signaling between the base station and a terminal outside the coverage of the base station is transmitted based on higher layer signaling, and the semi-persistent scheduled resource is allocated to the terminal outside the coverage of the base station, which can not only achieve an objective that the base station schedules resources directly to remote terminals, but also save scheduled resources and reduce latency of dynamic scheduling.

It should be noted that, in order to satisfy a short interval of data transmission, the interval between transmission resources configured by such semi-persistent scheduling may be shorter than that of traditional semi-persistent scheduling (SPS). In addition, the RRC message between the base station and the remote UE may be in pass-through mode for a relay UE, which means that the relay UE does not need to process the RRC message but simply forward the RRC message. Scheduling of the relay UE sending data to the remote UE is performed by the base station through the Uu interface.

According to implementations of the present disclosure, the base station first receives the scheduling request from the first terminal through the higher layer signaling, where the scheduling request is sent by the second terminal to the first terminal, the first terminal is within the coverage of the base station, and the second terminal is outside the coverage of the base station. Then, the base station sends the scheduled resource through the higher layer signaling to the first terminal according to the scheduling request, where the scheduled resource is forwarded by the first terminal to the second terminal. In this way, the scheduling signaling between the base station and the terminal outside the coverage of the base station is transmitted based on the higher layer signaling, which can achieve the objective that the base station schedules resources directly to remote terminals in relay scenario.

Referring to FIG. 3, FIG. 3 is a flowchart of a method for resource scheduling according to an implementation of the present disclosure. As illustrated, the method includes the following.

At S301, the second terminal sends a scheduling request through higher layer signaling to a first terminal.

In one implementation, the scheduling request may be a periodic service request. The second terminal may obtain traffic status of a current data service. According to the traffic status of the current data service, the second terminal may determine a service type of the data service. When the service type of the data service is a periodic service, the second terminal sends the periodic service request through the higher layer signaling to the first terminal. The first terminal forwards the periodic service request to the base station after receiving the periodic service request. When the service type of the data service is a non-periodic service, the second terminal may also send the scheduling request through the higher layer signaling. However, when the data service is not the absolute periodic service but approximates to the periodic service, in particularly a service that allows buffering in transmit end and traffic shaping, the second terminal may also send the periodic service request to the base station so as to obtain periodic scheduled resources. In one example, the second terminal does not need to determine the service type when the data service itself is a periodic service.

In one implementation, the higher layer signaling includes but is not limited to a radio resource control (RRC) message. In a traditional scheduling mechanism, dynamic scheduling of LTE system mainly relies on a scheduling request (SR), a buffer status report (BSR), or an uplink scheduling grant (UL grant) for resource scheduling. According to implementations of the present disclosure, the original underlying (such as a control element (CE) of the media access control (MAC) or a physical layer) scheduling function is implemented through the RRC message to avoid excessive impact on the MAC and underlying protocol.

At S302, the first terminal forwards the scheduling request to a base station.

At S303, the base station sends a scheduled resource to the first terminal through the higher layer signaling according to the scheduling request In one implementation, the base station allocates a semi-persistent scheduled resource according to the periodic service request, and sends the semi-persistent scheduled resource through the higher layer signaling to the first terminal. Therefore, scheduling resources can be saved, and latency of dynamic scheduling can be reduced. Semi-persistent scheduling means that during scheduling transmission of the LTE, the base station instructs current scheduling information to the UE through a physical downlink control channel (PDCCH) in initial scheduling, and when the UE identifies the semi-persistent scheduling, the UE saves the current scheduling information and performs sending or receiving of data services at a same time-frequency resource location every fixed period.

It should be noted that according to the traditional resource scheduling mechanism, the second terminal may use a sidelink (SL) SR or SL BSR mechanism to send the scheduling request over PC5 interface (interface between terminals) between the first terminal and the second terminal. Further, the first terminal forwards the SR or SL BSR to the base station. Upon receiving the scheduling request, the base station allocates resources to the second terminal, which is indicated by a scheduling grant message over Uu interface (interface between the base station and the terminal) and PC5 interface. However, the transmission of MAC messages may be delayed when forwarded by the first terminal, and a timing relationship between the SR/BSR and the grant may not be guaranteed. Consequently, in implementations of the present disclosure, the scheduling signaling between the base station and a terminal outside the coverage of the base station is transmitted based on higher layer signaling, and the semi-persistent scheduled resource is allocated to the terminal outside the coverage of the base station, which can not only achieve an objective that the base station schedules resources directly to remote terminals, but also save scheduled resources and reduce latency of dynamic scheduling.

It should be noted that, in order to satisfy a short interval of data transmission, the interval between transmission resources configured by such semi-persistent scheduling may be shorter than that of traditional semi-persistent scheduling (SPS). In addition, the RRC message between the base station and the remote UE may be in pass-through mode for a relay UE, which means that the relay UE does not need to process the RRC message but simply forward the RRC message. Scheduling of the relay UE sending data to the remote UE is performed by the base station through the Uu interface.

At S304, the first terminal forwards the scheduled resource to the second terminal.

Figure 4:
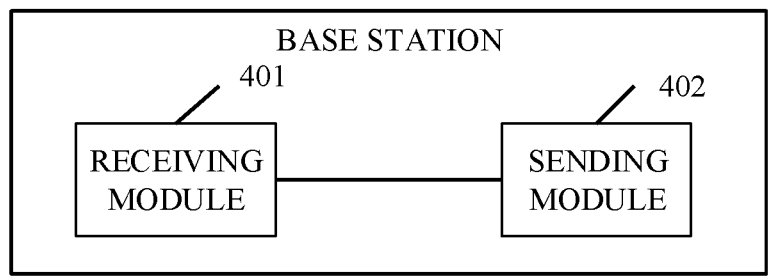
FIG. 4 is a schematic structural diagram of a base station according to an implementation of the present disclosure.

Referring to FIG. 4, FIG. 4 is a structural schematic diagram of a base station according to an implementation of the present disclosure. As illustrated, the base station includes a receiving module 401 and a sending module 402.

The receiving module 401 is configured to receive a scheduling request from a first terminal through higher layer signaling, where the scheduling request is sent by a second terminal to the first terminal, the first terminal is within coverage of the base station, and the second terminal is outside the coverage of the base station.

In one implementation, the scheduling request may be a periodic service request. The second terminal may obtain traffic status of a current data service. According to the traffic status of the current data service, the second terminal may determine a service type of the data service. When the service type of the data service is a periodic service, the second terminal sends the periodic service request through the higher layer signaling to the first terminal. The first terminal forwards the periodic service request to the base station after receiving the periodic service request. When the service type of the data service is a non-periodic service, the second terminal may also send the scheduling request through the higher layer signaling. However, when the data service is not the absolute periodic service but approximates to the periodic service, in particularly a service that allows buffering in transmit end and traffic shaping, the second terminal may also send the periodic service request to the base station so as to obtain periodic scheduled resources. In one example, the second terminal does not need to determine the service type when the data service itself is a periodic service.

In one implementation, the higher layer signaling includes but is not limited to a radio resource control (RRC) message. In a traditional scheduling mechanism, dynamic scheduling of LTE system mainly relies on a scheduling request (SR), a buffer status report (BSR), or an uplink scheduling grant (UL grant) for resource scheduling. According to implementations of the present disclosure, the original underlying (such as a control element (CE) of the media access control (MAC) or a physical layer) scheduling function is implemented through the RRC message to avoid excessive impact on the MAC and underlying protocol.

The sending module 402 is configured to send a scheduled resource through the higher layer signaling to the first terminal according to the scheduling request, where the scheduled resource is forwarded by the first terminal to the second terminal.

In one implementation, the base station allocates a semi-persistent scheduled resource according to the periodic service request, and sends the semi-persistent scheduled resource through the higher layer signaling to the first terminal. Therefore, scheduling resources can be saved, and latency of dynamic scheduling can be reduced. Semi-persistent scheduling means that during scheduling transmission of the LTE, the base station instructs current scheduling information to the UE through a physical downlink control channel (PDCCH) in initial scheduling, and when the UE identifies the semi-persistent scheduling, the UE saves the current scheduling information and performs sending or receiving of data services at a same time-frequency resource location every fixed period.

It should be noted that according to the traditional resource scheduling mechanism, the second terminal may use a sidelink (SL) SR or SL BSR mechanism to send the scheduling request over PC5 interface (interface between terminals) between the first terminal and the second terminal. Further, the first terminal forwards the SR or SL BSR to the base station. Upon receiving the scheduling request, the base station allocates resources to the second terminal, which is indicated by a scheduling grant message over Uu interface (interface between the base station and the terminal) and PC5 interface. However, the transmission of MAC messages may be delayed when forwarded by the first terminal, and a timing relationship between the SR/BSR and the grant may not be guaranteed. Consequently, in implementations of the present disclosure, the scheduling signaling between the base station and a terminal outside the coverage of the base station is transmitted based on higher layer signaling, and the semi-persistent scheduled resource is allocated to the terminal outside the coverage of the base station, which can not only achieve an objective that the base station schedules resources directly to remote terminals, but also save scheduled resources and reduce latency of dynamic scheduling.

It should be noted that, in order to satisfy a short interval of data transmission, the interval between transmission resources configured by such semi-persistent scheduling may be shorter than that of traditional semi-persistent scheduling (SPS). In addition, the RRC message between the base station and the remote UE may be in pass-through mode for a relay UE, which means that the relay UE does not need to process the RRC message but simply forward the RRC message. Scheduling of the relay UE sending data to the remote UE is performed by the base station through the Uu interface.

Figure 5:
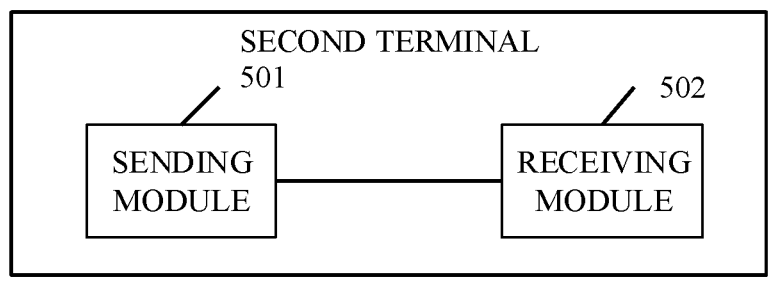
FIG. 5 is a schematic structural diagram of a second terminal according to an implementation of the present disclosure.

Referring to FIG. 5, FIG. 5 is a structural schematic diagram of a second terminal according to an implementation of the present disclosure. As illustrated, the second terminal includes a sending module 501 and a receiving module 502.

The sending module 501 is configured to send a scheduling request through higher layer signaling to a first terminal, where the scheduling request is forwarded by the first terminal to a base station, the first terminal is within coverage of the base station, and the second terminal is outside the coverage of the base station.

In one implementation, the sending module 501 is configured to determine a service type of a data service, and to send the periodic service request through the higher layer signaling to the first terminal based on a determination that the service type of the data service is a periodic service.

In one implementation, the sending module 501 is further configured to determine that the service type of the data service is the periodic service when the data service is a non-periodic service but the second terminal determines that the data service approximates to the periodic service.

The receiving module 502 is configured to receive a scheduled resource from the first terminal, where the scheduled resource is sent from the base station to the first terminal through the higher layer signaling according to the scheduling request.

It should be noted that the implementation of each module may also perform the method and function performed by the terminal in the foregoing implementation, with reference to the corresponding descriptions of the method embodiments illustrated in FIG. 2 and FIG. 3, which is not repeated herein.

Figure 6:
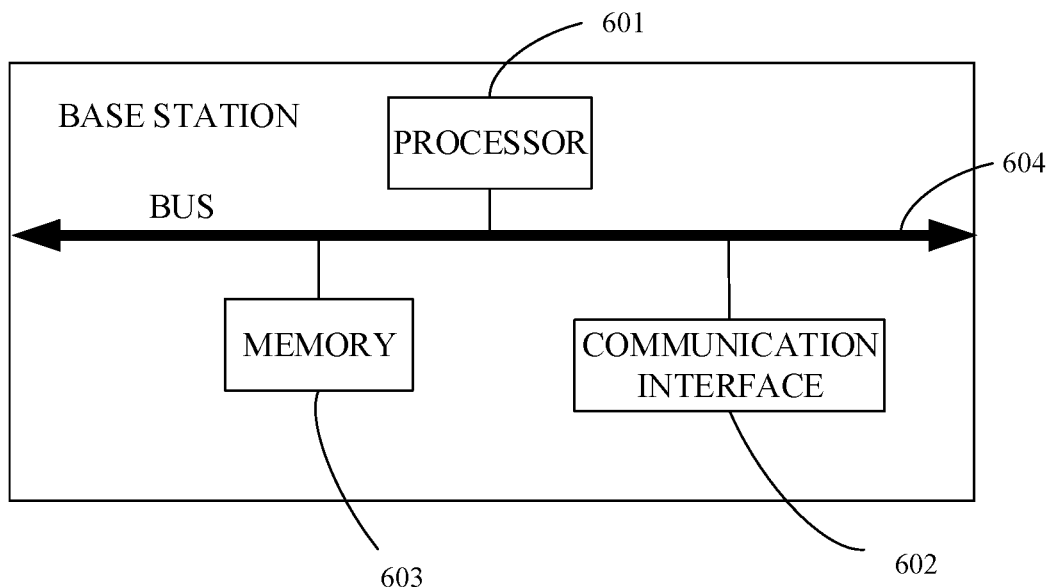
FIG. 6 is a schematic structural diagram of a base station according to another implementation of the present disclosure.

Referring to FIG. 6, FIG. 6 is a structural schematic diagram of a base station according to another implementation of the present disclosure. As illustrated, the base station may include at least one processor 601 such as a CPU, at least one communication interface 602, at least one memory 603, and at least one bus 604. The bus 604 is configured to implement connection and communication between the components. The communication interface 602 of the base station in the implementation of the present disclosure may be a wired transmit port, or may be a wireless device, for example, including an antenna apparatus. The communication interface 602 is configured to communicate signaling or data with other node devices. The memory 603 may be a high-speed RAM memory, or a non-volatile memory (NVM), such as, at least one magnetic disk storage. Alternatively, the memory 603 may be at least one storage apparatus that is located far away from the processor 601. The memory 603 stores a set of program codes, and the processor 601 is configured to invoke the program codes stored in the memory to execute the following operations of: receiving a scheduling request from a first terminal through higher layer signaling, where the scheduling request is sent by a second terminal to the first terminal, the first terminal is within coverage of the base station, and the second terminal is outside the coverage of the base station; and sending a scheduled resource through the higher layer signaling to the first terminal according to the scheduling request, where the scheduled resource is forwarded by the first terminal to the second terminal.

In one example, the processor 601 is further configured to execute the following operations of: allocating the semi-persistent scheduled resource according to the periodic service request; and sending the semi-persistent scheduled resource through the higher layer signaling to the first terminal.

Figure 7:
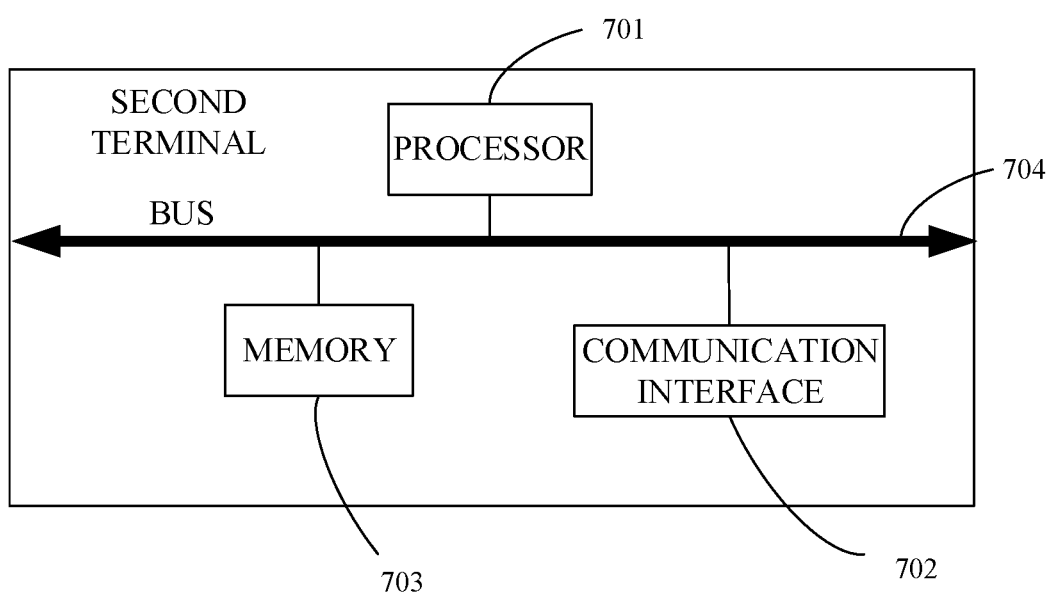
FIG. 7 is a structural schematic diagram of a second terminal according to another implementation of the present disclosure.

Referring to FIG. 7, FIG. 7 is a structural schematic diagram of a second terminal according to another implementation of the present disclosure. As illustrated, the second terminal may include at least one processor 701 such as a CPU, at least one communication interface 702, at least one memory 703, and at least one bus 704. The at least one bus 704 is configured to implement connection and communication between the components. The at least one memory 703 stores at least one computer executable instruction therein which, when executed by the at least one processor 701, causes the at least one processor to execute the foregoing methods.

It should be noted that implementations of the present disclosure may also be based on a virtual network device implemented by a general physical server in combination with network function virtualization (NFV) technology. The base station may be a virtual machine (VM) running a program for resource scheduling, which is deployed on a hardware device (for example, a physical server). A virtual machine refers to a complete computer system that has full hardware system functionality by software simulation and runs in a fully isolated environment.

It should be noted that, according to an implementation of the present disclosure, a computer readable storage medium is provided. The computer readable storage medium stores instructions which, when executed by a computer, causes the computer to execute the methods for resource scheduling according to the above aspects.

It should be noted that, according to an implementation of the present disclosure, a computer program product including instructions is provided. When executed by a computer, the computer program product causes the computer to execute the methods for resource scheduling according to the above aspects.

It should be noted that, for brief description, the foregoing method implementations are presented as a series of actions. However, a person skilled in the art should appreciate that the present disclosure is not limited to the described order of the actions, because according to implementations of the present disclosure, some steps may be performed in other orders or simultaneously. In addition, a person skilled in the art should also appreciate that all the implementations described in the specification are examples of implementations, and the related actions and modules are not necessarily mandatory to implementations of the present disclosure.

In the foregoing implementations, the description of each implementation has respective focuses. For a part that is not described in detail in an implementation, reference may be made to related descriptions in other implementations.

Persons of ordinary skill in the art may understand that all or some of the steps of the methods in the implementations may be implemented by a program instructing relevant hardware. The program may be stored in a computer readable storage medium. The storage medium may include a flash memory, a read-only memory (ROM), a random access memory (RAM), a magnetic disk, an optical disc, or the like.

A method for resource scheduling and related products provided in the implementations of the present disclosure are described in detail above. The principle and implementation of the present disclosure are described herein through specific examples. The description about the implementations of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A method for resource scheduling, comprising:
determining, by a second terminal, a service type of a data service, wherein the data service is determined to be periodic when the data service is a non-periodic service that approximates a periodic service;
when the data service is determined as periodic, sending, by the second terminal, a periodic service request through higher layer signaling to a first terminal, wherein the periodic service request is forwarded by the first terminal to a base station, the first terminal is within coverage of the base station, and the second terminal is outside the coverage of the base station; and
receiving, by the second terminal, a scheduled resource from the first terminal, wherein the scheduled resource is sent by the base station to the first terminal through the higher layer signaling according to the periodic service request.

2. The method of claim 1, wherein
the scheduled resource comprises a semi-persistent scheduled resource; and
the method further comprises:
after sending, by the second terminal, the periodic service request through the higher layer signaling to the first terminal, receiving, by the second terminal, the semi-persistent scheduled resource from the first terminal, wherein the semi-persistent scheduled resource is sent by the base station through the higher layer signaling to the first terminal.

3. The method of claim 1, wherein the higher layer signaling comprises a radio resource control (RRC) message.

4. The method of claim 1, wherein the non-periodic service approximates to the periodic service when the non-periodic service allows buffering in transmit end and traffic shaping.

5. A terminal, comprising:
at least one processor; and
a computer readable storage, coupled with the at least one processor and storing at least one computer executable instruction therein which, when executed by the at least one processor, causes the at least one processor to:

determine a service type of a data service, wherein the data service is determined to be periodic when the data service is a non-periodic service that approximates a periodic service;

when the data service is determined to be periodic, send a periodic service request through higher layer signaling to another terminal, wherein the periodic service request is forwarded by the other terminal to a base station, the other terminal is within coverage of the base station, and the terminal is outside the coverage of the base station; and receive a scheduled resource from the other terminal, wherein the scheduled resource is sent from the base station to the other terminal through the higher layer signaling according to the periodic service request.

6. The terminal of claim 5, wherein the scheduled resource comprises a semi-persistent scheduled resource; and the at least one processor is configured to:

receive the semi-persistent scheduled resource from the other terminal, wherein the semi-persistent scheduled resource is sent by the base station through the higher layer signaling to the other terminal.

7. The terminal of claim 5, wherein the higher layer signaling comprises a radio resource control (RRC) message.

8. The terminal of claim 5, wherein the non-periodic service approximates to the periodic service when the non-periodic service allows buffering in transmit end and traffic shaping.

* * * * *